United States Patent Office 2,696,469
Patented Dec. 7, 1954

2,696,469

CARBON BLACK LUBRICATING GREASE

Rosemary O'Halloran, Roselle Park, N. J., assignor to Standard Oil Development Company, a corporation of Delaware No Drawing. Application February 9, 1952, Serial No. 270,898

5 Claims. (Cl. 252—22)

The present invention relates to an improved carbon black lubricating grease, that is, a grease wherein a carbon black dispersed in oil is employed as the principal thickening agent.

In recent years there has been an increasing use of carbon black in certain types of industrial lubricants. Although lubricating greases have been thickened with soaps for many years, it has been found that for certain high temperature operations, for example in steel rolling mills and comparable heavy industrial equipment, the conventional soap thickeners are lacking in adequate heat stability. The tend to break down at temperatures of 400° F. or more, whereas operating temperatures in machinery of this type in some cases may approach 600° F. or higher. The lubricating oils themselves, which are used in lubricating greases, ordinarily are quite heat stable at temperatures up to or even above 600° F. if properly selected, but the breakdown of the soap structure at high temperatures results in oil separation or liquefaction of the grease. As a result, the grease runs out of the bearings or away from the mechanical parts being lubricated, leaving them inadequately protected. The proper lubrication of such equipment has offered considerable difficulty.

With the introduction of carbon black, especially acetylene black, as a thickener for steel mill greases and the like some of the foregoing objections have been overcome, but in some cases new problems have arisen. The more modern steel rolling mills and related equipment are often equipped with central lubricating systems. In these systems the lubricant is forced from a central point through tubes or other conduits to the various points requiring lubrication. In such systems clogging may occur if the grease thickener separates from the oil. Soap thickened lubricants of good quality are sufficiently stable against mechanical pressure so that there is no serious separation of the oil from the thickener. The soap is carried along with the oil without depositing on the conduit walls and no clogging results, provided the grease is of stable type. With carbon black thickened greases of the prior art, however, some difficulty has been encountered in securing adequate resistance to separation. Although such greases have high heat stability, they leave something to be desired in their structure stability.

In a copending application, Serial No. 218,260, filed March 29, 1951, now Patent No. 2,653,131 issued September 22, 1953, of which the present is, in some respects at least, a continuation-in-part, there is disclosed a lubricating grease composition where carbon black greases have combined with them certain soaps, especially aluminum soaps, particularly aluminum stearate and closely related soap products. Such a combination of carbon black and soap thickener improves resistance to oil separation under pressure.

As pointed out in the application mentioned above, the tendency to separate oil under pressure, which is quite common in carbon black greases, tends to form deposits and eventually complete plugs of relatively dry carbon black which block the tubes or narrow passages of central lubricating systems. The application points out how a minor amount of aluminum soap of saturated fatty acids reduces the oil separation tendency very materially. It is postulated there that the aluminum soap, a well known gelling agent for mineral oils, holds the oil much more firmly than the carbon black does. While the soap per se probably breaks down at high operating temperatures, the carbon black thickener maintains a good grease structure at the point of use.

In addition, however, to requirements for heat stability and mechanical stability, lubricating greases for heavy industrial machinery of the general type mentioned above must be capable of affording protection to the mechanical parts under conditions of high unit pressure. Mineral lubricating oil, which is the essential lubricating element in the usual lubricating grease, is somewhat deficient in lubricating properties under extreme pressure conditions. Some of the heavy industrial machines of the type mentioned above are equipped with roller bearings or other anti-friction bearings. In such equipment unit pressures frequently run very high. An object of the present invention is to improve performances of carbon black-soap thickened greases at both high temperature and high pressure.

A standard test which is used to determine the extreme pressure lubricating characteristics of an industrial lubricant is the so-called "Timken Test." Essentially, the Timken Test is conducted in a machine which rotates a steel test ring at 600 R. P. M. against a stationary steel block. A variable load is applied to maintain pressure between the parts, and the oil is applied freely to keep them lubricated. In this particular test the machine is operated for 11¼ minutes under a constant applied load. If the ring and block do not become scored to such an extent as to indicate lubricant failure, the lubricant is considered to pass the test under the particular load conditions employed. A 33 pound O. K. load is considered by bearing manufacturers to denote a product which is satisfactory for heavily loaded industrial bearings in the type of machinery described above.

Hence, another important aspect of the present invention resides in the discovery of superior extreme pressure properties which can be imparted to carbon black greases by a proper choice of ingredients without imparing other essential properties. It is well known in the prior art that various additives, especially additives which contain moderately active sulfur, chlorine, or phosphorus, or lead, or a combination of two or more of these, may be very useful to increase the load-carrying capacity of lubricating compositions. It is believed that the load-carrying or extreme pressure performance of these additives is due to the fact that they react with the metals being protected when the latter reach certain momentary elevated temperatures. Thus, where an oil film or the like begins to fail, a minute area of the metal may increase very quickly in temperature. This almost instantaneous and usually very local increase in temperature causes an immediate reaction with the sulfur, chlorine, phosphorus, or lead (or combination of some of these materials) with the metal itself to form a very thin protective film. This film is adequate to provide boundary lubrication and to prevent seizure and damage to the parts until the normal oil film can be re-established. Thus, the application of extremely high unit pressures does not cause serious damage to the mechanical parts even where the oil or grease film per se fails momentarily.

In the carbon black greases some increase in load bearing performance has been obtained in the past by adding conventional extreme pressure agents to the lubricant. However, in most prior art greases the carbon black tends to absorb these agents from the oil and thereby largely destroys their load carrying properties.

One of the most widely used extreme pressure additives in greases and gear oils is lead soap such as oleate.

It has previously been suggested as a desirable component in carbon black greases. Previous experience has shown, however, that because of adsorption and perhaps for other reasons most of the extreme pressure or load bearing additives, and especially lead oleate, are relatively ineffective in the presence of the usual types of carbon black employed in these greases. Some previous attempts have been made to reduce such adsorption, without complete success.

According to the present invention it has been discovered that the load bearing performance of carbon black greases may be improved in several respects by a combination of two modifications. The first of these is the particular choice of carbon black thickener. It should have a pH value between 2 and 5, which is considerably below the pH value of most carbon blacks. It should have an average particle size (average diameter) below about 20 microns. This means that a commercial black should be chosen which holds more than 5% volatile matter. Carbon black, as produced commercially, appears to adsorb certain materials in the burning process which give it a definite alkalinity or acidity. Those commonly used in the prior art have usually been slightly on the alkaline side, having a pH value of around 8 to 10, commonly about 9. Acetylene black, which has excellent grease forming structural characteristics, has been widely used as the carbon black thickener as previously noted. It has a pH value, however, of about 8. According to the present invention it is desirable to use carbon black having a pH value in the range of about 2 to 5, and preferably from 3 to 4. A commercial channel black known as "Superba" which is widely available has a pH value of about 3.5, and is very satisfactory for the purposes of the present invention.

In combination with the aluminum soap base, this particular black forms a satisfactory grease structure, whereas other channel blacks do not, and would require the incorporation of some acetylene black to provide adequate structure. This type of black is usually used in the manufacture of printers' ink, and by itself will not thicken oil to any measurable extent, because of its very small particle size and low structure index. However, in the presence of aluminum soap as an auxiliary gelling agent, excellent results are obtained.

It appears probable that the carbon black having a lower pH value and containing volatile matter tends to adsorb much less of the organic acid, glyceride, and other radicals of certain types of extreme pressure additives, e. g. fatty acids, sulfurized fatty oils, phosphosulfurized organic products, etc. These additives are believed to possess extreme pressure properties by virtue of their polar attraction for metal surfaces. A high pH (alkaline) black attracts these polar materials, and diverts them from metal lubrication. The additives used appear to exert their maximum effect in the presence of an acid black.

The "Superba" black utilized in these greases appears to be better than other low pH blacks tried in this connection, although probably not so unique that no other black would be suitable. Lamp black and "Statex" furnace blacks, which lack some of the properties mentioned above, were tested and found to give fluid dispersions which did not raise the dropping point of the product over the 150–200° F. typical aluminum grease per se. They are not satisfactory thickeners. "Micronex" channel black will not disperse in the aluminum soap grease. The "Superba" black is a uniform, high quality product of pH, particle size and volatile matter content which gives consistent results. It is therefore preferred for this formula.

Another aspect of the present invention lies in the discovery that a combination of extreme pressure additives including derivatives of fats or fatty acids in combination with phosphate esters is unusually effective. Thus, a combination of sulfurized sperm oil, fatty acid, and phosphate ester is more effective than a combination which includes lead oleate instead of the phosphate ester. In usual lubricants, lead oleate would be expected to be superior.

A combination of the low pH carbon black with extreme pressure ingredients just named, i. e., sulfurized fatty oil, fatty acid, and phosphate ester, shows outstanding load bearing properties. A grease containing these ingredients in combination with a carbon black having the properties previously specified shows an entirely satisfactory pass at a 38 pound load on the Timken machine.

Although the combination of extreme pressure agents mentioned above is particularly effective in carbon black greases, and especially in those using a carbon black thickener of low pH value and small particle size, plus high volatile content, the combination of such agents per se also is very useful in other types of greases. They may be used also in fluid type extreme pressure lubricants. They have particular utility, however, in the carbon black greases such as steel rolling mill greases because they solve a problem which has been very difficult to solve.

The products of the present invention may be prepared as follows. Mineral oil and a small proportion of aluminum soap of substantially saturated fatty acids (preferably averaging about $C_{16}$ to $C_{20}$) are charged to a kettle and heated to a temperature of about 250–300° F. while stirring. The fatty acid extreme pressure additive may be added to the molten soap base if desired. The resulting product is a transparent gel when cooled to room temperature. The carbon black is added and worked into the cooled gel by stirring or homogenizing, the extreme pressure additives ordinarily being introduced later. After these are stirred in, the finished grease is filtered and drawn into package containers.

The aluminum soap used is preferably commercial aluminum stearate, although the aluminum soap of hydrogenated fish oil acids of $C_{12}$–$C_{22}$ chain length is substantially equivalent. Commercial aluminum stearate is essentially an aluminum di-stearate containing considerable proportions, up to about 10%, of free stearic acid. It is very satisfactory. Preferred mineral oils are distillates of conventionally refined mineral oils of 50–90 S. S. U. viscosity at 210° F. though a wider range of 35 to 200 S. S. U. may be used for some purposes. A particularly suitable oil for steel rolling mills and like equipment has a viscosity of about 70 S. S. U. at 210° F.

As pointed out in the copending application Serial No. 218,260 mentioned above, the proportions of aluminum soap may be varied rather widely from about 1.5 to 10% by weight of the total composition. A preferred range is between about 1.5 and 3.5%. The carbon black content may be from as little as about 3% up to about 30% by weight of the total composition, a preferred range being between 5 and 15%. The extreme pressure additive may be employed in various proportions, usually between 5 and 20%, about 10% being preferred for general purposes.

While sulfurized sperm oil is a preferred extreme pressure ingredient, it will be understood that other fatty oils, either sulfurized or phosphosulfurized, may be employed if desired. A sulfurized sperm oil containing about 12% by weight of sulfur is specifically preferred. Oleic acid is a preferred ingredient because of its excellent oiliness characteristics, though the related saturated fatty acids such as palmitic or stearic acid may be used in some cases with as good results. A commercial grade of fatty acid may be employed very satisfactorily, i. e. it need not be chemically pure. Other esters of phosphoric acid may be substituted for tricresyl phosphate such as tributyl phosphate, but tricresyl phosphate of technical grade which is available commercially is preferred. It confers excellent load bearing properties on carbon black greases.

In general, the proportions of sulfurized fatty oil may be varied from about 3 to 15%, proportions of about 5 to 10% based on the total composition being preferred. The oleic or other fatty acids should be used in proportions of about 1 to 5%, 1 to 3% being preferred, and the tricresyl phosphate or equivalent ester is employed in proportions of 0.1 up to about 5%, the optimum being about 0.5 to 2% by weight based on the total composition.

According to the present invention a number of greases were prepared and compared, using both conventional acetylene black of high surface pH value and the commercial black sold under the trade name "Superba" mentioned above. In the first two examples listed under acetylene black, conventional extreme pressure additives including lead oleate were employed. In the third another type of additive including a chlorinated product of commercial manufacture was used. In the fourth, experimental extreme pressure additives of commercial type were used, all without success. The results are summarized in the following table. The ingredients not specified were mineral oil and the carbon black content in each case was 10% by weight of the total composition.

*Timken performance of carbon black-aluminum soap, greases*

|  | Additives, Percent | | | | Timken Test | | |
|---|---|---|---|---|---|---|---|
|  | Lead Soap | Sulfurized Sperm Oil | Oleic Acid | Tricresyl Phosphate | Rating | Scar Width, Cm. | Score |
| Acetylene Black | 20 | 5 | -------- | ---------- | Fail 33 | .20 | Heavy. |
|  | 25 | 6.25 | -------- | ---------- | Fail 33 | .25 | Do. |
|  | ¹18 | -------- | -------- | ---------- | Fail 33 | .25 | Do. |
|  | 2 | 9 | 2 | ---------- | Fail 33 | .25 | Do. |
|  | -------- | 9 | 2 | ---------- | Fail 33 | .40 | Light. |
|  | -------- | 9 | 2 | 0.5 | Fail 33 | .35 | Smooth. |
|  | -------- | 9 | 5 | 1.0 | Pass 33 | .15 | Do. |
|  | -------- | 9 | 2 | 0.5 | Pass 33 | .15 | Do. |
| Superba Black | -------- | 9 | 2 | 1.0 | Pass 38 | .17 | Do. |
|  | -------- | 9 | ²2 | 1.0 | Pass 38 | .15 | Do. |

¹ Also contains 2% chlorinated paraffin wax.
² Hydrogenated fish oil acids, $C_{12}$ to $C_{22}$ mixture.

It will be understood that conventional additives of the prior art may be used in the compositions of the present invention so far as they are not incompatible therewith. Thus, synthetic oils may be substituted for all or part of the mineral oil and metal deactivators, antioxidants, tackiness agents, viscosity index improvers, and the like may be added in conventional proportions without departing from the spirit of the present invention.

What is claimed is:

1. A lubricating grease comprising a major proportion of lubricating oil thickened to a grease consistency with a minor grease-thickening proportion of carbon black having a surface pH value not greater than 5.0, an average particle diameter below about 20 microns and a volatile matter content of at least 5% by weight, said grease containing from about 6–15% by weight, based on total grease, of an extreme pressure additive composed essentially of about 5–10% by weight, based on total grease, of sulfurized sperm oil, about 1–5% by weight, based on total grease, of a free high molecular weight fatty acid and about 0.1–2% by weight, based on total grease, of an oil-soluble phosphate ester selected from the group consisting of tricresyl and tributyl phosphates, said sulfurized sperm oil, fatty acid and phosphate ester being present in a weight ratio of about 9:2:0.5–1, respectively.

2. A lubricating grease comprising a major proportion of mineral lubricating oil thickened to a grease consistency with a combination of 3–30% by weight, based on total grease, of carbon black and 1.5–10% by weight, based on total grease of aluminum soap, said carbon black having a surface pH value not greater than 5.0, an average particle diameter below about 20 microns and a volatile matter content of at least 5% by weight, said grease containing from about 6–15% by weight, based on total grease, of an extreme pressure additive composed essentially of about 5–10% by weight, based on total grease, of sulfurized sperm oil, about 1–5% by weight, based on total grease, of a free high molecular weight fatty acid and about 0.1–2% by weight, based on total grease, of an oil-soluble phosphate ester selected from the group consisting of tricresyl and tributyl phosphates, said sulfurized sperm oil, fatty acid and phosphate ester being present in a weight ratio of about 9:2:0.5–1, respectively.

3. A lubricating grease composition according to claim 2 wherein the carbon black thickener is present in proportions of 5 to 15% by weight, based on the total composition.

4. A grease as claimed in claim 2 in which said fatty acid is oleic acid and said phosphate ester is tricresyl phosphate.

5. A lubricating composition comprising a major proportion of mineral base lubricating oil of about 50–90 S. S. U. viscosity at 210° F., 1.5–3% by weight of aluminum soap of substantially saturated fatty acid, about 10% by weight of an amorphous carbon black having a surface pH value between 2.0 and 5.0, a particle size below 20 microns average diameter and a volatile matter content above 5% by weight, about 9% by weight of sulfurized sperm oil, about 2% by weight of oleic acid, and about 0.5–1% by weight of tricresyl phosphate.

References Cited in the file of this patent

UNITED STATES PATENTS

| Number | Name | Date |
|---|---|---|
| 2,367,355 | Kaufman et al. | Jan. 16, 1945 |
| 2,415,836 | Musselman | Feb. 18, 1947 |
| 2,453,153 | Morway et al. | Nov. 9, 1948 |
| 2,480,647 | Gurd et al. | Aug. 30, 1949 |
| 2,487,260 | Morway | Nov. 8, 1949 |
| 2,487,261 | Zimmer et al. | Nov. 8, 1949 |
| 2,498,628 | Cyphers et al. | Feb. 28, 1950 |
| 2,522,460 | Morway et al. | Sept. 12, 1950 |
| 2,638,446 | Wasson | May 12, 1953 |
| 2,640,811 | Beretvas | June 2, 1953 |
| 2,653,131 | O'Halloran | Sept. 22, 1953 |

OTHER REFERENCES

Lubrication, May 1953, vol. 39, No. 5, page 70, Extreme Pressure Additives, Texas Co., publisher.